(12) United States Patent
Inaba et al.

(10) Patent No.: US 11,292,455 B2
(45) Date of Patent: Apr. 5, 2022

(54) VEHICLE TRAVELING CONTROL DEVICE

(71) Applicant: Hitachi Automotive Systems, Ltd., Hitachinaka (JP)

(72) Inventors: Ryoh Inaba, Tokyo (JP); Katsuro Watanabe, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/962,916

(22) PCT Filed: Jan. 29, 2019

(86) PCT No.: PCT/JP2019/002848
§ 371 (c)(1),
(2) Date: Jul. 17, 2020

(87) PCT Pub. No.: WO2019/167518
PCT Pub. Date: Sep. 6, 2019

(65) Prior Publication Data
US 2021/0061263 A1    Mar. 4, 2021

(30) Foreign Application Priority Data

Mar. 1, 2018 (JP) ............................. JP2018-036935

(51) Int. Cl.
*B60W 30/06* (2006.01)
*B60W 30/14* (2006.01)
*G06K 9/00* (2006.01)

(52) U.S. Cl.
CPC .......... *B60W 30/06* (2013.01); *B60W 30/143* (2013.01); *G06K 9/00798* (2013.01); *G06K 9/00812* (2013.01)

(58) Field of Classification Search
CPC ............................ B60W 30/06; B60W 30/143; G06K 9/00798; G06K 9/00812; B62D 15/0285
See application file for complete search history.

(56) References Cited

U.S. PATENT DOCUMENTS 6,483,442 B2 * 11/2002 Shimizu .................... B60R 1/00
                                                                     180/204
2012/0101654 A1    4/2012 Samples et al.
(Continued)

FOREIGN PATENT DOCUMENTS

JP      2014-141216 A     8/2014
JP      2016-182891 A    10/2016
(Continued)

OTHER PUBLICATIONS

International Search Report (PCT/ISA/210) issued in PCT Application No. PCT/JP2019/002848 dated Apr. 23, 2019 with English translation (five (5) pages).
(Continued)

*Primary Examiner* — Daryl C Pope
(74) *Attorney, Agent, or Firm* — Crowell & Moring LLP

(57) ABSTRACT

When an automatic parking function and an automatic driving function are provided in the same system, a vehicle stops for parking trajectory calculation when switching between an automatic driving mode and an automatic parking mode is performed, and thus, there is concern that a driver is likely to feel discomfort with this stop. A surrounding environment recognition unit, a host vehicle position detection unit, an automatic driving trajectory calculation unit that calculates an automatic driving trajectory based on a current position and a surrounding environment of the host vehicle and a destination input result, a parking section detection calculation unit that detects a parking space around a destination based on the surrounding environment of the host vehicle, an automatic parking trajectory calculation unit that calculates an automatic parking trajectory along which the host vehicle is parked in the parking space, and a transition mode trajectory calculation unit that calculates a transition mode trajectory based on the automatic parking trajectory and the surrounding environment are provided.

(Continued)

The automatic parking trajectory calculation unit calculates the automatic parking trajectory while the host vehicle is tracking the transition mode trajectory.

12 Claims, 17 Drawing Sheets

(56) References Cited

U.S. PATENT DOCUMENTS

| | | | |
|---|---|---|---|
| 2016/0207527 A1* | 7/2016 | Hiei | B60W 50/10 |
| 2018/0058879 A1 | 3/2018 | Tayama et al. | |
| 2018/0257662 A1 | 9/2018 | Ishigooka et al. | |

FOREIGN PATENT DOCUMENTS

| | | |
|---|---|---|
| JP | 2017-24598 A | 2/2017 |
| JP | 2017-81290 A | 5/2017 |
| JP | 2017-165407 A | 9/2017 |
| JP | 2017-214011 A | 12/2017 |

OTHER PUBLICATIONS

Japanese-language Written Opinion (PCT/ISA/237) issued in PCT Application No. PCT/JP2019/002848 dated Apr. 23, 2019 (four (4) pages).

* cited by examiner

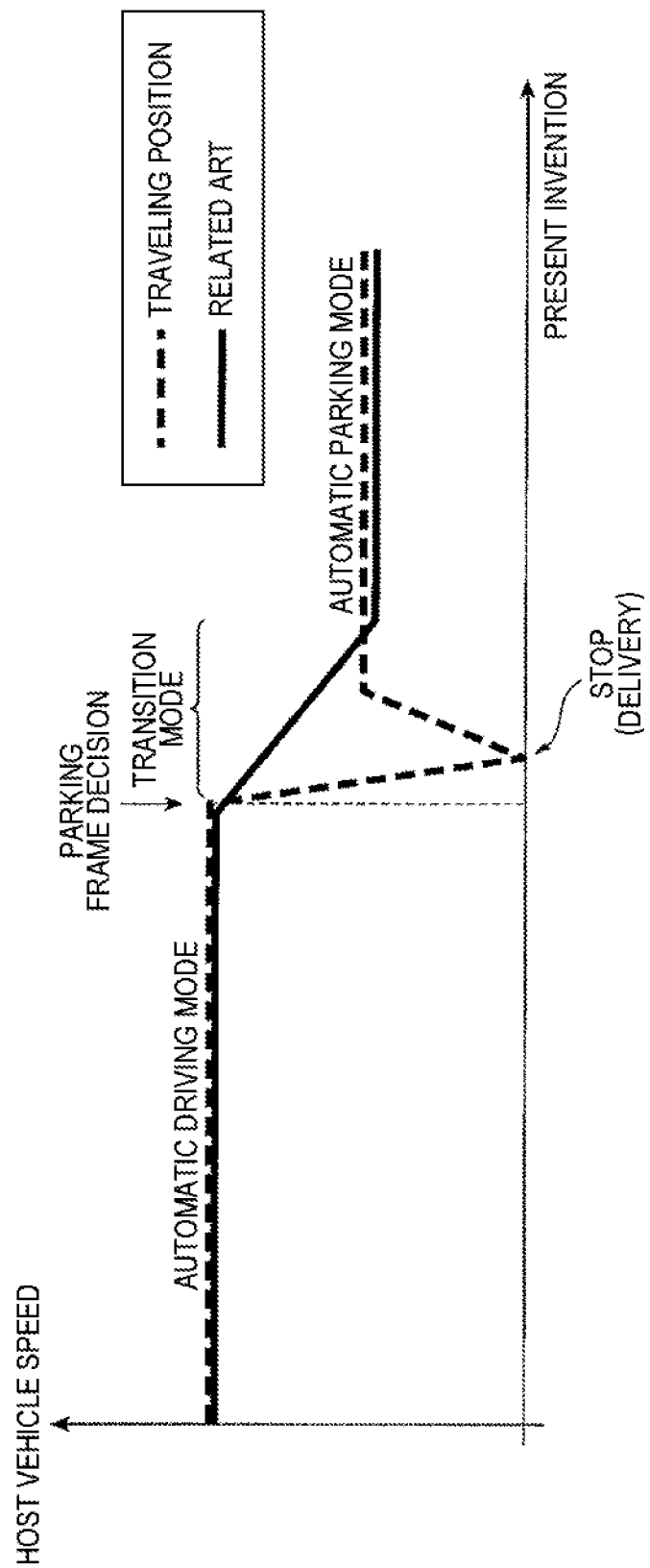

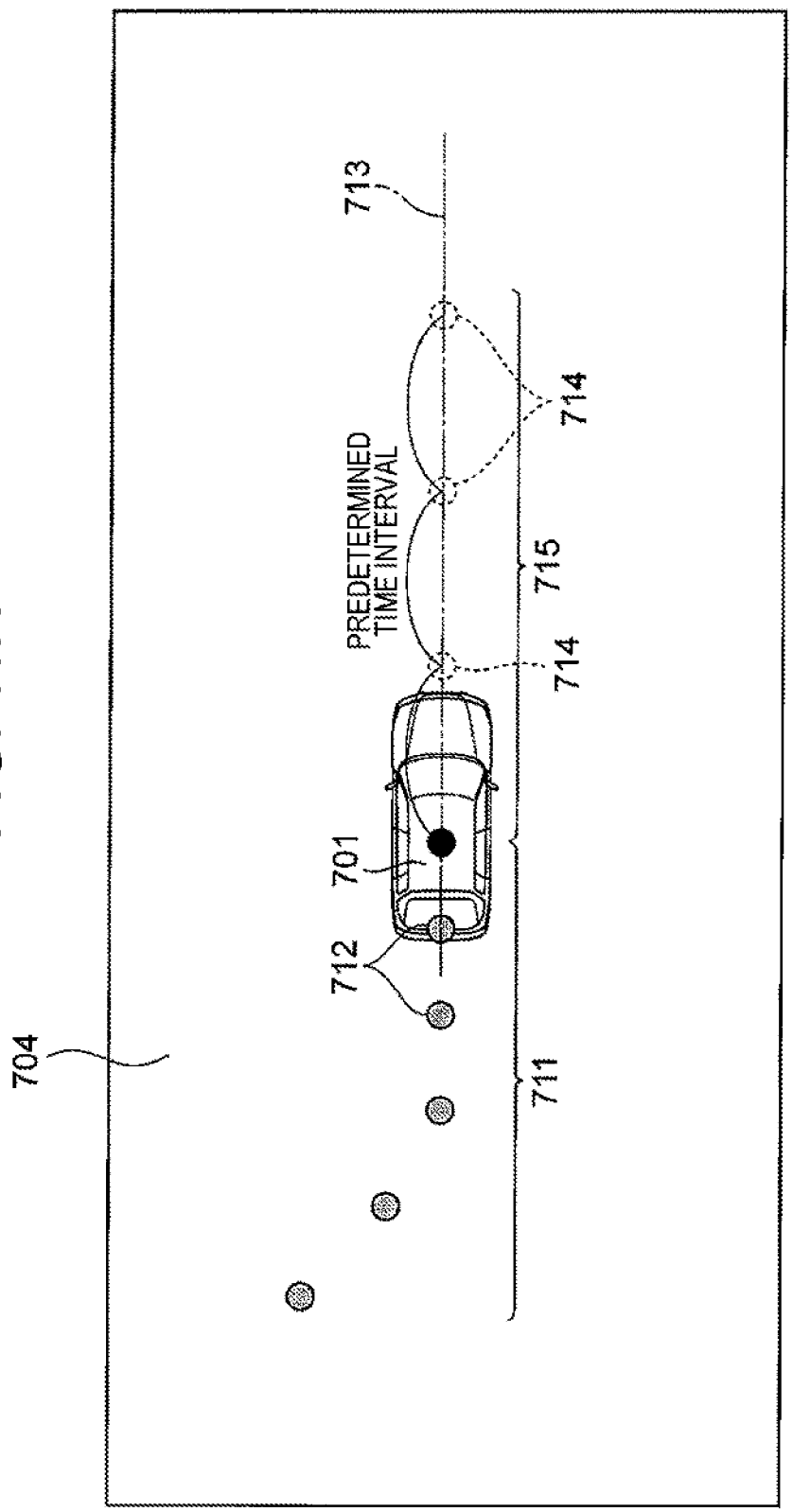

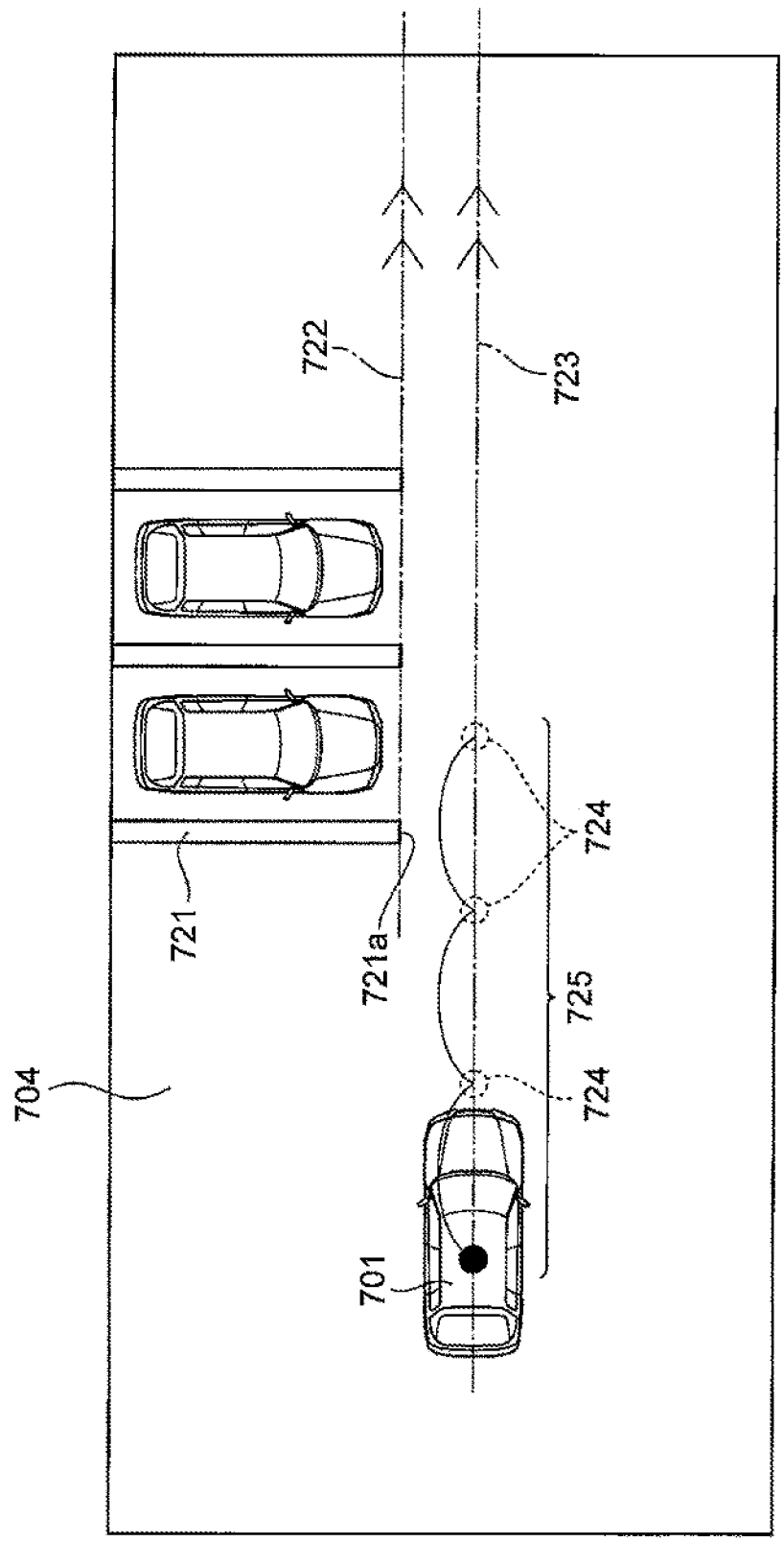

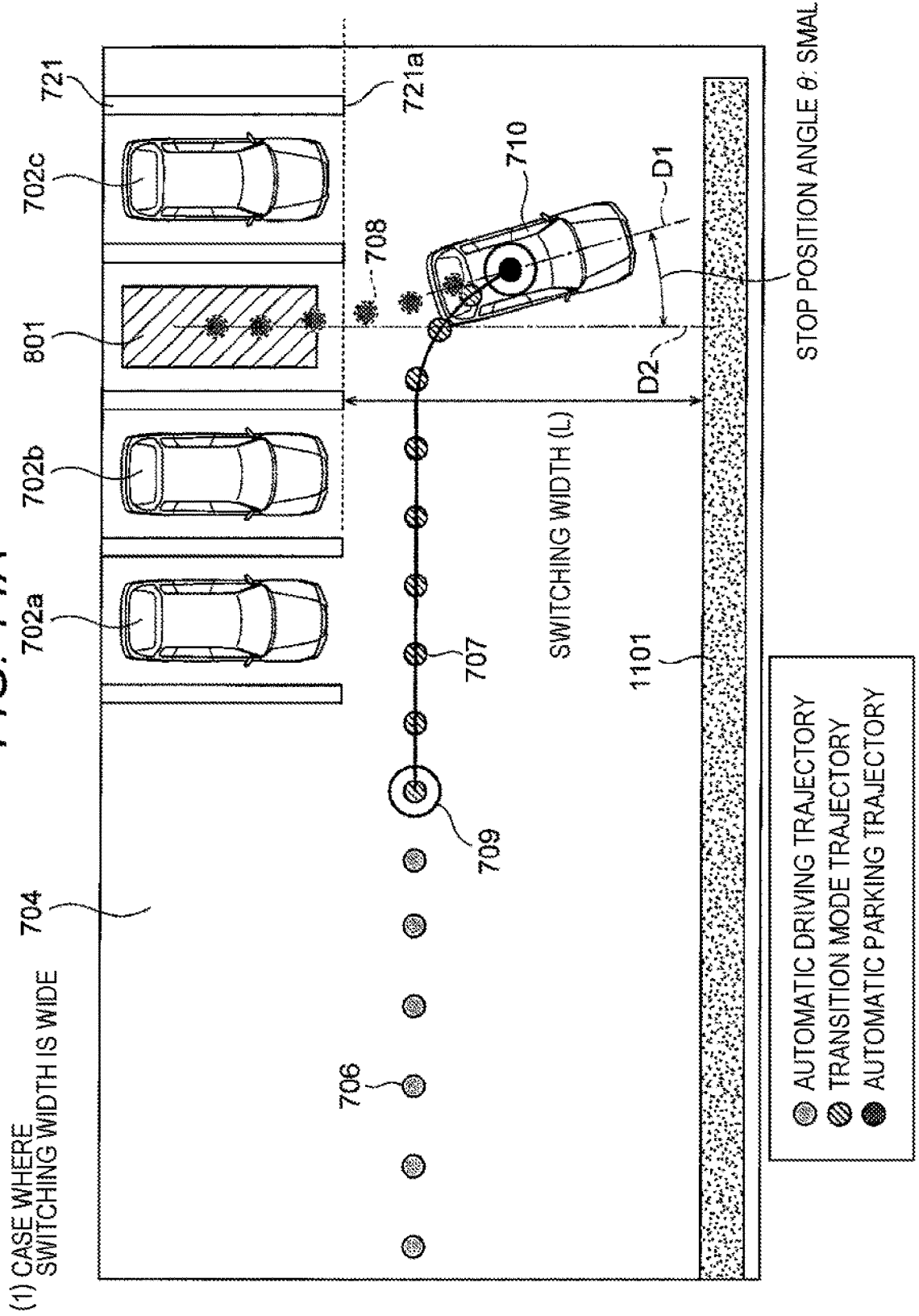

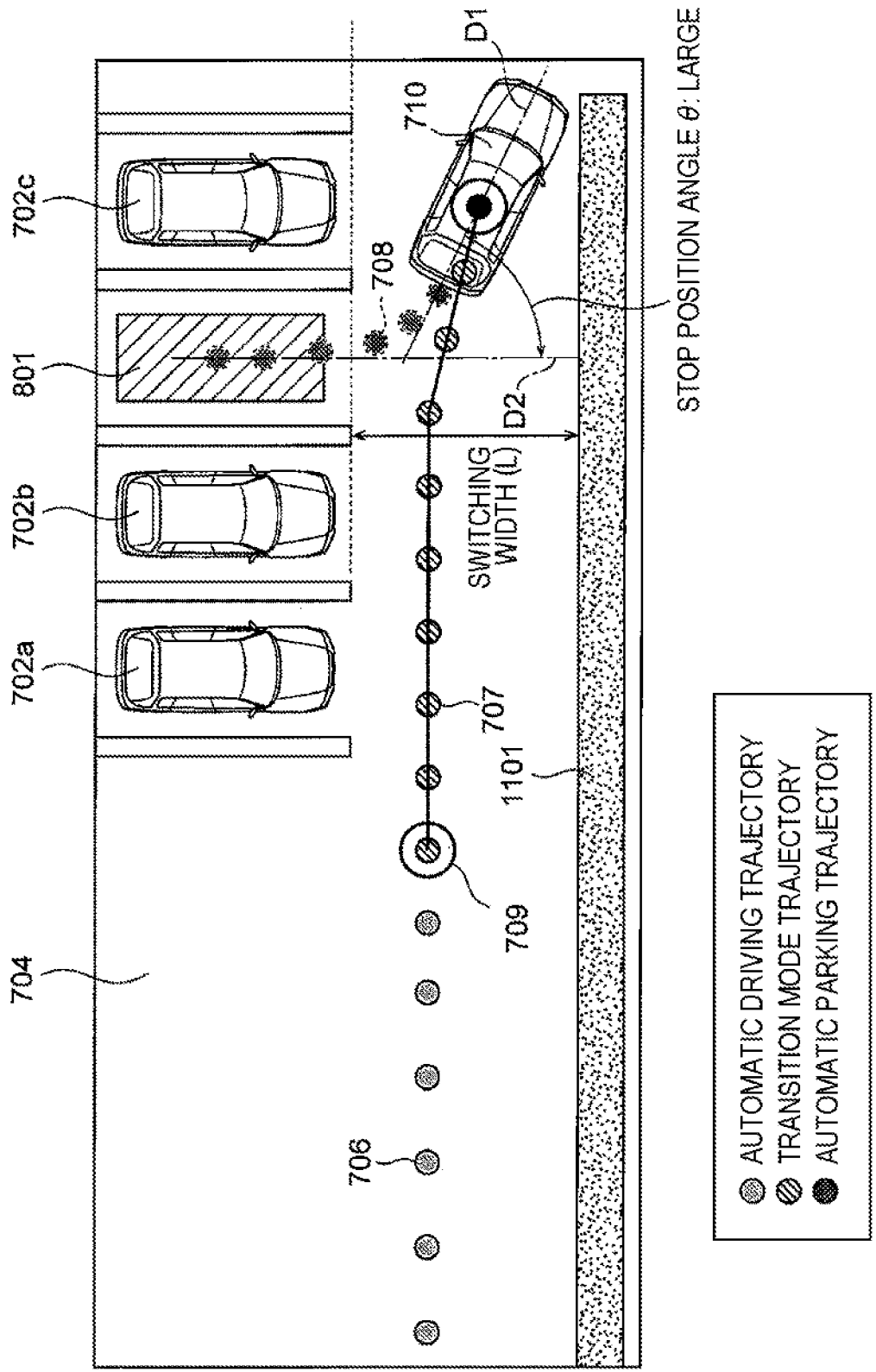

VEHICLE TRAVELING CONTROL DEVICE

TECHNICAL FIELD

The present invention relates to a vehicle traveling control device that controls traveling of a vehicle such as an automobile, and particularly, to a vehicle traveling control device that performs automatic driving control for moving a host vehicle to a destination and automatic parking control for parking the host vehicle in a parking space around the destination.

BACKGROUND ART

In the related art, when a host vehicle is parked at a destination desired by a driver, an automatic parking function for automatically parking the host vehicle in a parking space after the parking space is automatically found and the found parking space is notified to the driver in order to reduce a burden on the driver has been developed (for example, see PTL 1).

In the future, it is expected that an automatic driving function capable of automatically traveling to the vicinity of the destination desired by the driver without being operated by the driver for steering and acceleration and deceleration on a public road is provided. It is also assumed that an automatic driving system and an automatic parking system are developed by different vendors.

CITATION LIST

Patent Literature

PTL 1: JP 2014-141216 A

SUMMARY OF INVENTION

Technical Problem

However, when the automatic parking function and the automatic driving function are provided in the same system, the vehicle stops for parking trajectory calculation when switching from an automatic driving mode to an automatic parking mode is performed and thus, there is concern that a driver is likely to feel discomfort with this stop.

The present invention has been made in view of the above points, and an object of the present invention is to provide a vehicle traveling control device capable of reducing unnecessary stoppage and a parking time during parking.

Solution to Problem

In order to solve the problems, a vehicle traveling control device according to the present invention is a vehicle traveling control device that performs automatic driving control for moving a host vehicle to a destination and automatic parking control for parking the host vehicle in a parking space around the destination. The device includes an automatic driving trajectory calculation unit that calculates an automatic driving trajectory along which the host vehicle is moved to the destination, an automatic parking trajectory calculation unit that calculates an automatic parking trajectory along which the host vehicle is parked in the parking space, and a transition mode trajectory calculation unit that calculates a transition mode trajectory connecting the automatic driving trajectory and the automatic parking trajectory.

Advantageous Effects of Invention

According to this invention, it is possible to reduce unnecessary stoppage and a parking time during parking. Further features related to the present invention will become apparent from the description of the present specification and the accompanying drawings. Other objects, configurations, and effects will be made apparent in the descriptions of the following embodiments.

BRIEF DESCRIPTION OF DRAWINGS

FIG. 10 is an explanatory diagram illustrating a relationship between a speed and a traveling position of the automatic driving vehicle near the parking space according to the present invention.

FIG. 11A is a diagram for describing an example of a method of generating a transition mode trajectory.

FIG. 11B is a diagram for describing an example of the method of generating the transition mode trajectory.

FIG. 14A is a diagram for describing an example of the method of generating the transition mode trajectory.

FIG. 14B is a diagram for describing an example of the method of generating the transition mode trajectory.

DESCRIPTION OF EMBODIMENTS

Hereinafter, embodiments of the present invention will be described with reference to the drawings.

First Embodiment

Figure 1:
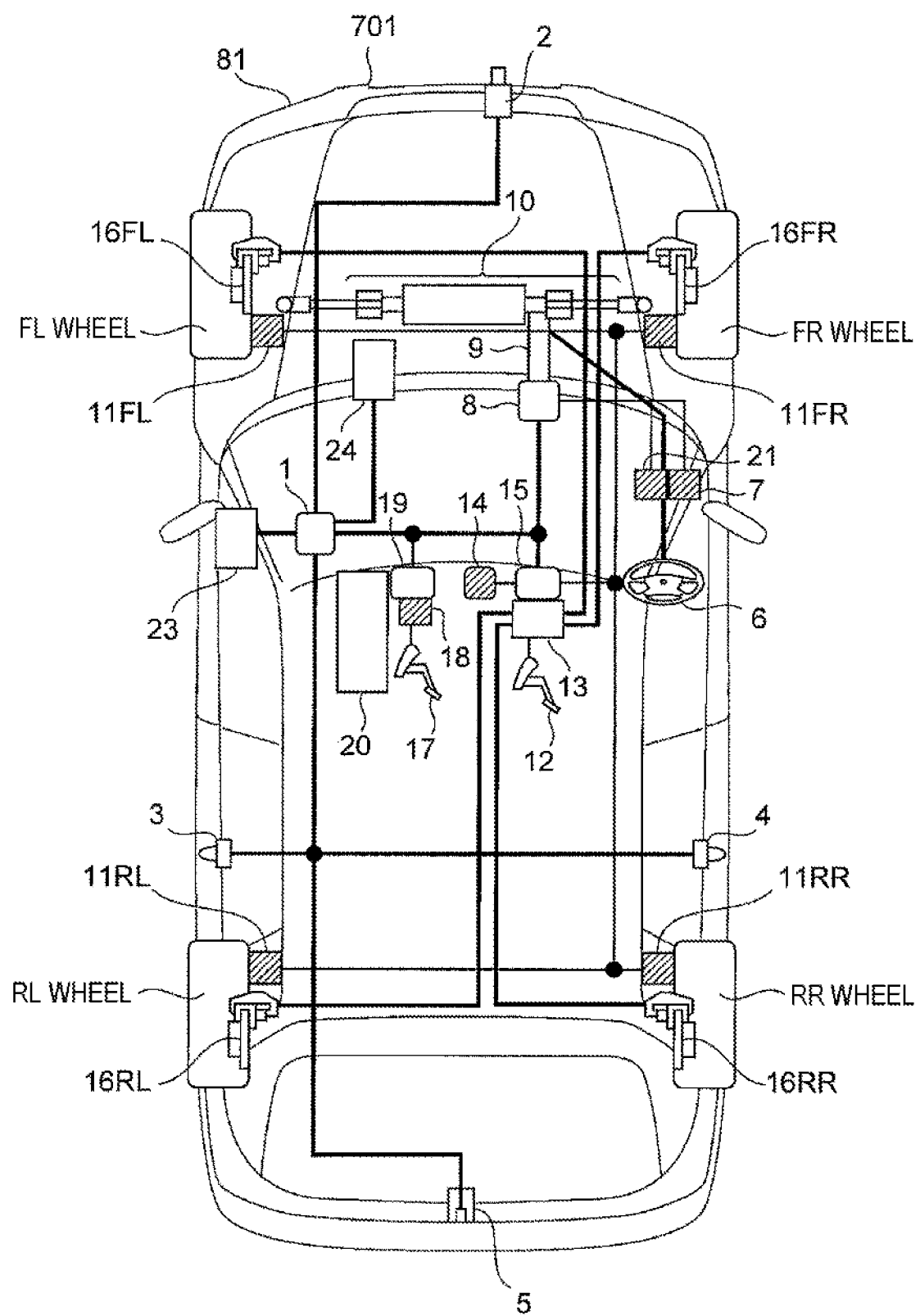
FIG. 1 is a block diagram illustrating configurations of a traveling drive system and a sensor of an automatic driving traveling vehicle according to the present invention.

FIG. 1 is an explanatory diagram illustrating an overall configuration of a vehicle 701 having a first embodiment of the present invention mounted thereon. An FL wheel means a left front wheel, an FR wheel means a right front wheel, an RL wheel means a left rear wheel, and an RR wheel means a right rear wheel.

The vehicle 701 includes a vehicle traveling control device 1 that calculates command values for a steering control mechanism 10 that controls a traveling direction of the vehicle, a brake control mechanism 13, and a throttle control mechanism 20 based on information of sensors 2, 3, 4, and 5 that recognize the outside. The vehicle includes a steering control device 8 that controls the steering control mechanism 10 based on the command value from the vehicle traveling control device 1, a braking control device 15 that controls the brake control mechanism 13 to adjust a braking force distribution of the wheels based on the command value, an acceleration control device 19 that controls the throttle control mechanism 20 to adjust a torque output of an engine based on the command value, and a display device 24 that displays a traveling plan of the host vehicle 701 and a behavior prediction of a moving object present in the vicinity.

A camera 2 on a front side, laser radars 3 and 4 on left and right sides, and a millimeter wave radar 5 on a rear side are provided as the sensors that recognize the outside, and the sensors can detect relative distances and relative speeds between the host vehicle and surrounding vehicles. The vehicle includes a communication device 23 that performs a road-to-vehicle communication and an inter-vehicle communication. In the present embodiment, a combination of the aforementioned sensors is illustrated as an example of a sensor configuration. However, the present invention is not limited thereto, and a combination of an ultrasonic sensor, a stereo camera, and an infrared camera may be used. Signals of the sensors are input to the vehicle traveling control device 1.

Although not illustrated in detail in FIG. 1, the vehicle traveling control device 1 includes, for example, a CPU, a ROM, a RAM, and an input and output device. The ROM stores a flow of vehicle traveling control to be described below. Although details will be described below, the vehicle traveling control device 1 calculates the command values for the actuators 10, 13, and 20 for controlling the vehicle traveling according to the generated traveling plan. The control devices 8, 15, and 19 of the actuators 10, 13, and 20 receive the command values of the vehicle traveling control device 1 through communication, and control the actuators based on the command values.

Next, an operation of a brake will be described. In a state in which a driver is driving the vehicle, a pedaling force of the driver who steps on a brake pedal 12 is boosted by a brake booster (not illustrated), and a master cylinder (not illustrated) generates a hydraulic pressure corresponding to this force. The generated hydraulic pressure is supplied to a wheel cylinder 16 via the brake control mechanism 13. Each of wheel cylinders 16FL to 16RR includes a cylinder (not illustrated), a piston, and a pad. The piston is propelled by a hydraulic fluid supplied from the master cylinder 9, and a pad connected to the piston is pressed against a disk rotor. The disk rotor rotates together with wheels (not illustrated). Thus, a brake torque acting on the disk rotor becomes a braking force acting between the wheels and a road surface. As described above, the braking force can be generated on the wheels according to a brake pedal operation of the driver.

Although not illustrated in detail in FIG. 1, the braking control device 15 includes, for example, a CPU, a ROM, a RAM, and an input and output device, as in the vehicle traveling control device 1. Braking force commands from a combined sensor 14 capable of detecting a longitudinal acceleration, a lateral acceleration, and a yaw rate, wheel speed sensors 11FL to 11RR installed on the wheels, and the braking control device 15, and sensor signals from a steering wheel angle detection device 21 via the steering control device 8 to be described below are input to the braking control device 15. An output of the braking control device 15 is connected to a brake control mechanism 13 having a control valve and a pump (not illustrated), and can generate any braking force on each wheel independently of the brake pedal operation of the driver. The braking control device 15 has a role of estimating the spin and drift-out of the vehicle and locking of the wheels based on the aforementioned information, generating the braking force for the corresponding wheel so as to suppress the spin, drift-out, and locking, and increasing steering stability of the driver. The vehicle traveling control device 1 can generate any braking force in the vehicle by communicating a brake command to the braking control device, and has a role of automatically braking in automatic driving in which the operation of the driver does not occur. However, the present invention is not limited to the braking control device, and another actuator such as a brake-by-wire may be used.

Next, an operation of a steering wheel will be described. In a state in which the driver is driving the vehicle, a steering torque and a steering wheel angle input by the driver via a steering wheel 6 are detected by a steering torque detection device 7 and the steering wheel angle detection device 21, and the steering control device 8 controls a motor to generate an assist torque based on these pieces of information. Although not illustrated in detail in FIG. 1, the steering control device 8 also has, for example, a CPU, a ROM, a RAM, and an input and output device as in the vehicle traveling control device 1. The steering control mechanism 10 is moved by a resultant force of the steering torque of the driver and the assist torque by the motor, and the front wheels are turned. Meanwhile, a reaction force from the road surface is transmitted to the steering control mechanism according to a turning angle of the front wheels, and is transmitted as a road surface reaction force to the driver.

The steering control device 8 generates a torque by a motor 9 independently of a steering operation of the driver, and can control the steering control mechanism 10. Accordingly, the vehicle traveling control device 1 can control the front wheels at any turning angle by communicating a steering force command to the steering control device 8, and has a role of automatically steering in the automatic driving in which the operation of the driver does not occur. However, the present invention is not limited to the steering control device, and another actuator such as a steer-by-wire may be used.

Next, an accelerator will be described. The stepping amount of an accelerator pedal 17 of the driver is detected by a stroke sensor 18, and is input to the acceleration control device 19. Although not illustrated in detail in FIG. 1, the acceleration control device 19 also has, for example, a CPU, a ROM, a RAM, and an input and output device as in the vehicle traveling control device 1. The acceleration control device 19 adjusts a throttle opening degree according to the stepping amount of the accelerator pedal, and controls the engine. As described above, the vehicle can be accelerated according to the operation of the accelerator pedal by the driver. The acceleration control device 19 can control the throttle opening degree independently of the accelerator operation of the driver. Accordingly, the vehicle traveling control device 1 can generate any acceleration in the vehicle by communicating an acceleration command to the acceleration control device 19, and has a role of automatically accelerating in the automatic driving in which the operation of the driver does not occur.

Figure 2:
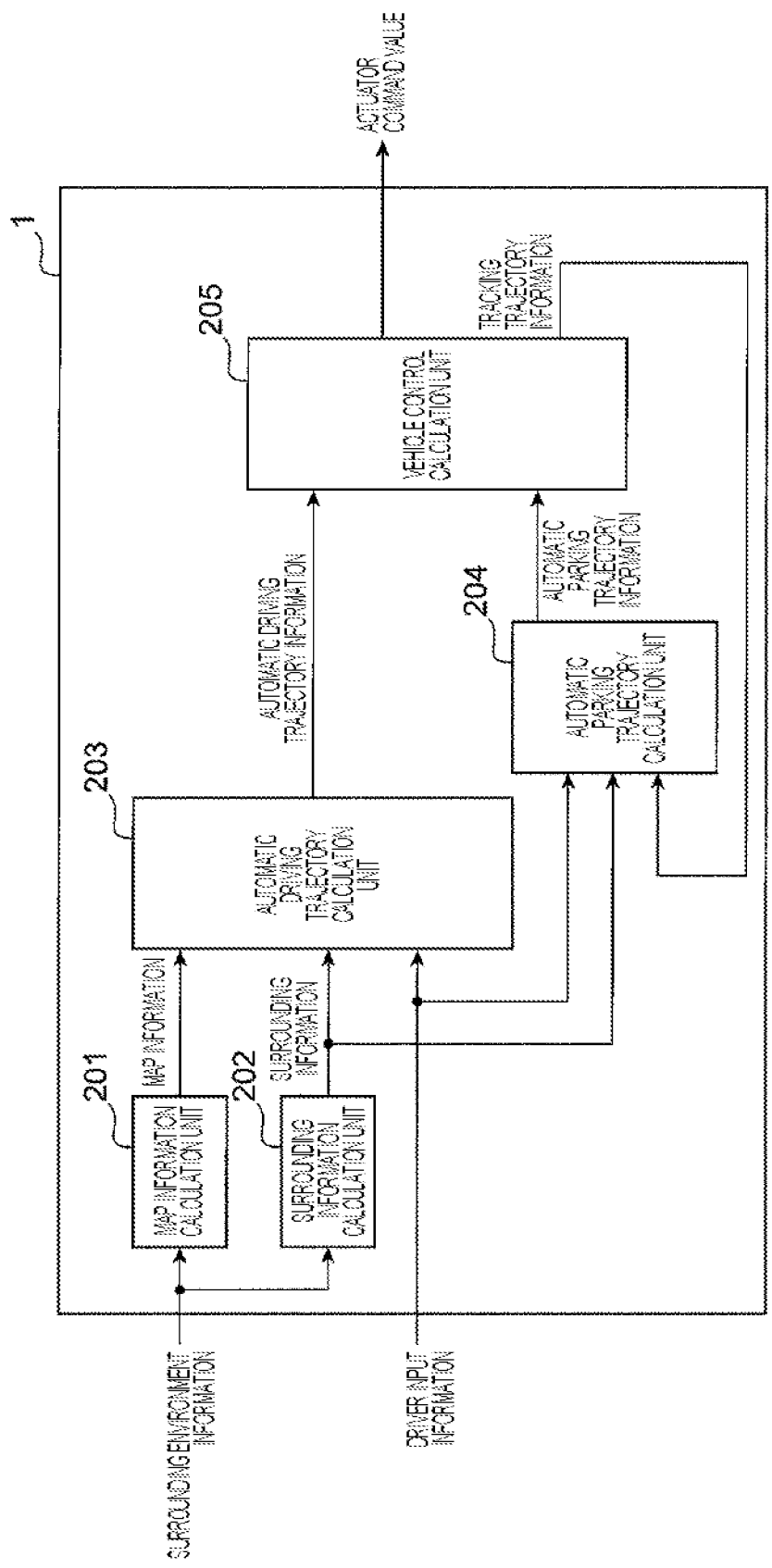
FIG. 2 is a block diagram illustrating a configuration of an automatic driving control device.

Next, a configuration of an automatic driving control device mounted on the vehicle traveling control device 1 of the present embodiment will be described with reference to a block diagram illustrated in FIG. 2. The vehicle traveling control device 1 is a device that controls the traveling of the host vehicle, and has a configuration that performs, in particular, automatic driving control for moving the host vehicle to a destination and automatic parking control for parking the host vehicle in a parking space around the destination. The vehicle traveling control device 1 includes a map information calculation unit 201, a surrounding information calculation unit 202, an automatic driving trajectory calculation unit 203, an automatic parking trajectory calculation unit 204, and a vehicle control calculation unit 205.

The map information calculation unit 201 inputs host vehicle positional information input from a host vehicle position detection unit such as GPS and surrounding environment information obtained based on the information of the sensors 2, 3, 4, and 5 that recognize the outside, and calculates surrounding map information from the host vehicle to the surroundings of the destination by using map information stored in a storage device within the vehicle traveling control device 1. A method of utilizing map information stored on a network by communicating with an external network by using an external communication device mounted on the vehicle may be considered as a means for acquiring the map information.

The surrounding information calculation unit 202 as a surrounding environment recognition unit inputs the surrounding environment information, and converts the input surrounding environment information into object information such as an obstacle or a moving object present around the host vehicle. Attribute information and lane information of pedestrians, bicycles, and vehicles, and current positions and current speed vectors thereof are extracted as specific object information. Here, it is assumed that the moving object includes a parked vehicle that may move in the future even though the speed obtained at the current time is zero. Objects that are fixed and do not move such as guardrails, fences, and poles are included in the obstacles.

The automatic driving trajectory calculation unit 203 calculates an automatic driving trajectory based on the map information, surrounding information, and, for example, driver input information input by the driver operating a human machine interface (HMI) mounted on the host vehicle.

The automatic parking trajectory calculation unit 204 calculates an automatic parking trajectory based on the surrounding information, the driver input information, and tracking trajectory information to be described below. The automatic driving trajectory and the automatic parking trajectory are calculated in parallel at the same time by the same calculation device or different calculation devices.

The vehicle control calculation unit 205 calculates actuator command values which are command values for a power device and a steering device of the vehicle, and the tracking trajectory information based on the automatic driving trajectory and the automatic parking trajectory.

Figure 3:
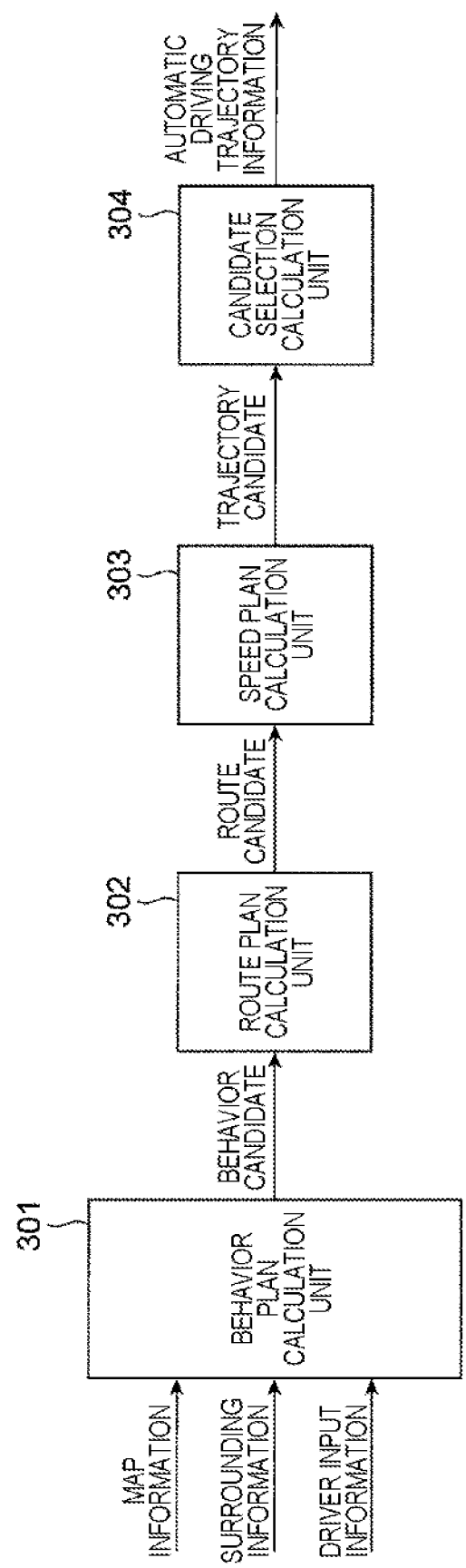
FIG. 3 is a block diagram illustrating a configuration of an automatic driving trajectory calculation unit of the automatic driving control device.

Next, processing of the automatic driving trajectory calculation unit 203 will be described with reference to a block diagram illustrated in FIG. 3.

Automatic Driving Trajectory Calculation Unit

The automatic driving trajectory calculation unit 203 includes a behavior plan calculation unit 301, a route plan calculation unit 302, a speed plan calculation unit 303, and a candidate selection calculation unit 304. The automatic driving trajectory calculation unit 203 plans a traveling route of the host vehicle and a speed at this time based on the map information and the surrounding information as the input information and the driver input information. These pieces of information are used for planning in three steps of behaviors, routes, and speeds.

First, the behavior plan calculation unit 301 generates behavior candidates that may be obtained in a traveling environment as targets of management of a current control state and a trajectory plan. The number of candidates is not limited to one, but may be plural.

The route plan calculation unit 302 generates route candidates corresponding to candidates, but does not consider a speed change of the host vehicle at this stage. From the viewpoint of vehicle motion, since a speed plan and a route plan are closely related, a method of simultaneously planning the speed and the route is considered. However, a combination is enormous, and thus, calculation cost may increase. Thus, in the present configuration, it is assumed that the route candidates are generated at a constant speed and the speed plan calculation unit 303 drafts the speed plan for each route candidate.

The candidate selection calculation unit 304 selects an appropriate evaluation function for the host vehicle and the surrounding moving body, plans an optimal speed pattern with a predicted position and a collision risk at each predetermined time in the future as costs, and calculates evaluation values thereof. It is assumed that a combination of the route and the speed pattern planned as described above is the automatic driving trajectory.

Automatic Parking Trajectory Calculation Unit

Figure 4:
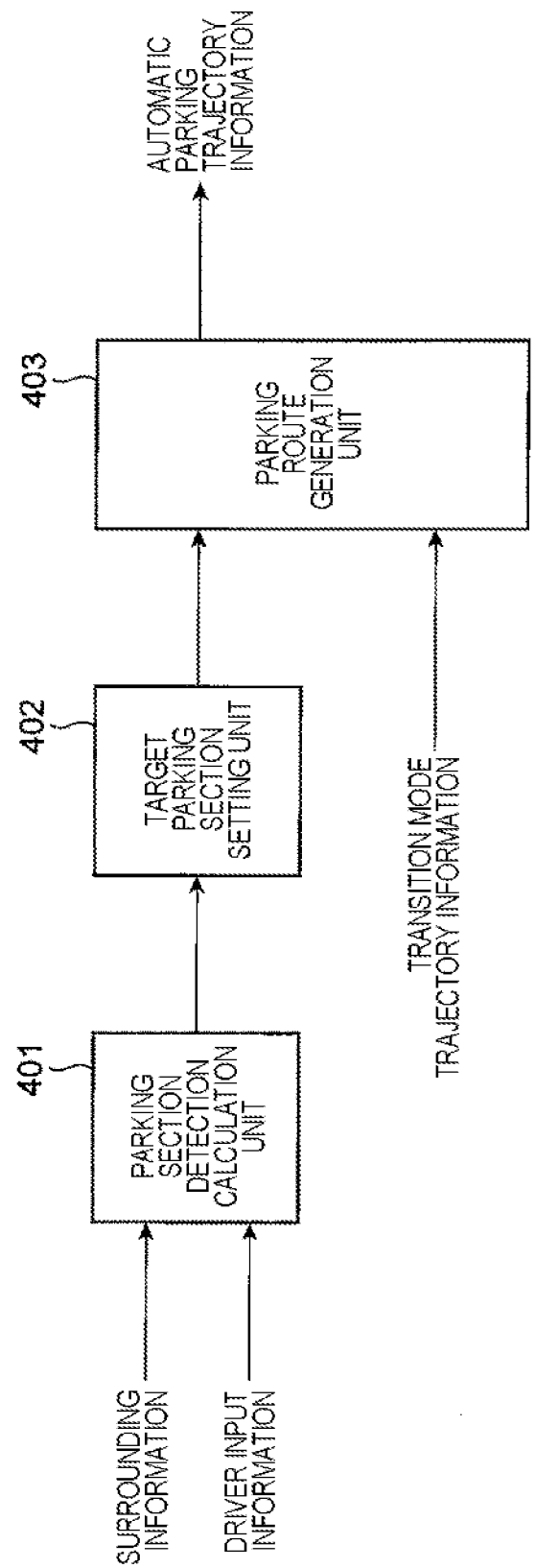
FIG. 4 is a block diagram illustrating a configuration of an automatic parking trajectory calculation unit of the automatic driving control device.

Next, the automatic parking trajectory calculation unit 204 will be described with reference to a block diagram illustrated in FIG. 4.

The automatic parking trajectory calculation unit 204 starts to calculate the automatic parking trajectory when the host vehicle arrives at the destination and a target parking space (parking section) around the destination is set. The automatic parking trajectory calculation unit 204 includes a parking section detection calculation unit 401, a target parking section setting unit 402, and a parking route generation unit 403.

The parking section detection calculation unit 401 selects two adjacent line segments that are likely to form a parking space from line segments detected by white line detection processing based on the surrounding information and the driver input information. The two line segments selected herein are line segments that form both left and right ends of a parking section line that partitions the parking space in an extending direction. When it is determined that the section defined by these line segments satisfies a predetermined condition, the section is registered as a candidate for the parking space.

The target parking section setting unit 402 determines whether or not one parking space is selected by the user or automatically. When the vehicle traveling control device 1 automatically selects the parking space, a method of learning in advance a preference of a user when the user parks the vehicle in the parking space and determining the parking space, or a method of selecting a location close to a destination 705 (see FIG. 7), a location at which the user easily gets on or off the vehicle, or a location with a roof in rainy weather. When the user selects the parking space, for example, a method of displaying a plurality of parking spaces in which the vehicle can be parked on a monitor mounted on the vehicle by using a touch panel function of the monitor and selecting the parking space by pressing a position of a desired parking space by the user is considered. One parking space selected by the user or automatically is set as a target parking space.

The parking route generation unit 403 generates a parking route for parking the vehicle in the target parking space. Since various variations such as a parking route along which a distance to complete parking is minimized, a parking route along which the vehicle is parked forward from a front end of the vehicle, and a parking route along which the vehicle has the small number of turns as possible are considered as the parking route to be generated, the driver of the vehicle may select an appropriate parking route by presenting conditions related to the route to be generated.

Figure 12:
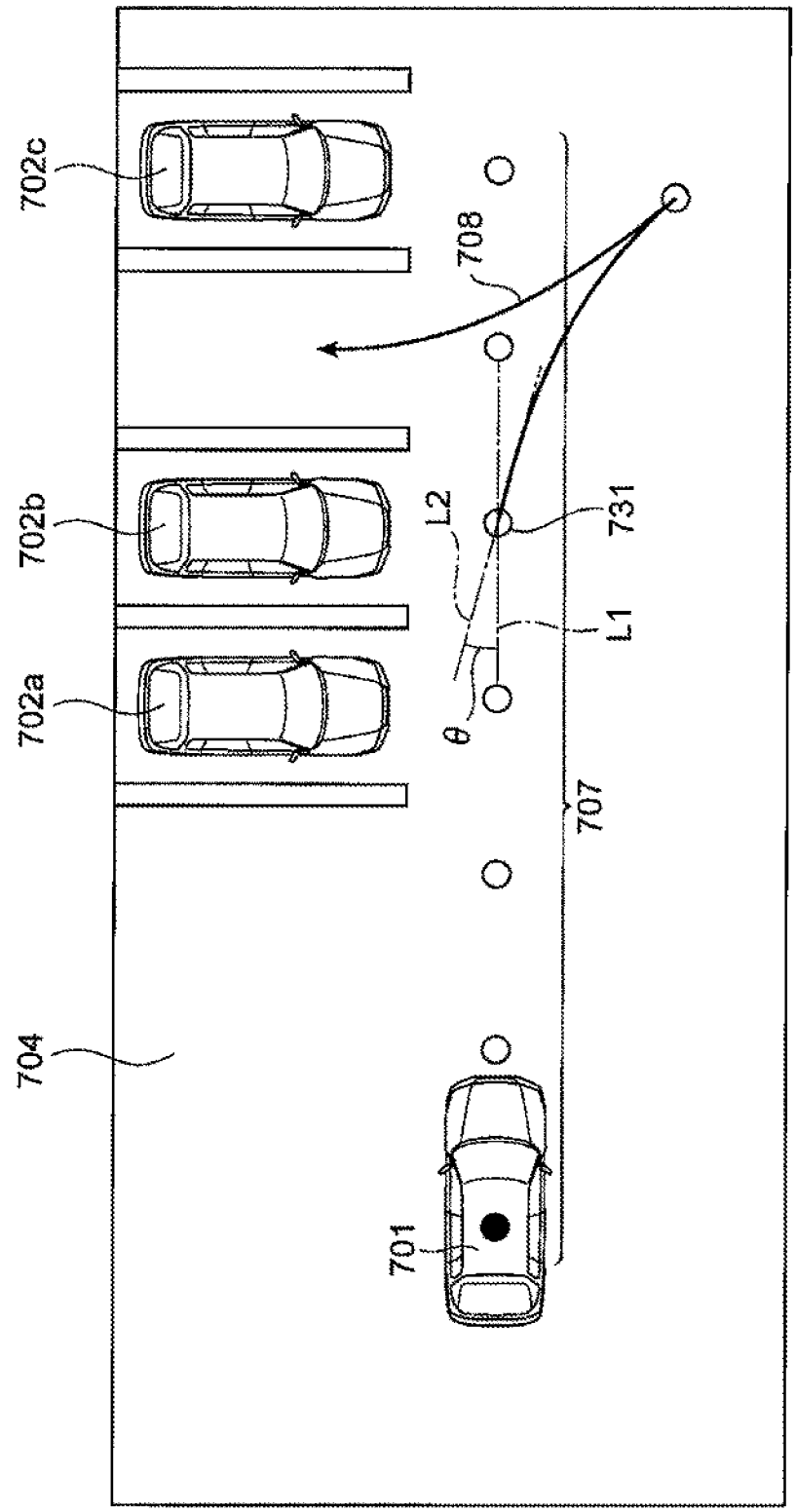
FIG. 12 is a diagram illustrating a connection between the transition mode trajectory and the automatic parking trajectory.

As illustrated in FIG. 12, a method of smoothly connecting a transition mode trajectory 707 and a generated automatic parking trajectory 708 without discontinuity is considered. It is desirable that the parking route generation unit 403 generates the automatic parking trajectory 708 on the transition mode trajectory 707 such that a start point of the automatic parking trajectory 708 substantially coincides with the transition mode trajectory 707. That is, it is desirable that the automatic parking trajectory 708 is generated on the transition mode trajectory such that the transition mode trajectory 707 and the start point of the automatic parking trajectory substantially coincide with each other.

It is desirable that an angle θ formed by a tangent L1 of the transition mode trajectory 707 at a point 731 at which the start point of the automatic parking trajectory 708 substantially coincide with the transition mode trajectory 707 on the transition mode trajectory 707 and a tangent L2 at the start point of the generated automatic parking trajectory 708 is substantially zero (≈0°). It is desirable that a target vehicle speed of the transition mode trajectory 707 at the point 731 at which the start point of the automatic parking trajectory and the transition mode trajectory substantially coincide with each other and a target vehicle speed at the start point of the automatic parking trajectory 708 substantially coincide with each other and are equal to or greater than zero. When transition from the transition mode trajectory 707 to the automatic parking trajectory 708 is performed, it is possible to reduce a possibility that a sense of anxiety is given to an occupant without applying unnecessary acceleration and deceleration to the host vehicle 701 by generating the parking route in such as condition.

Figure 5:
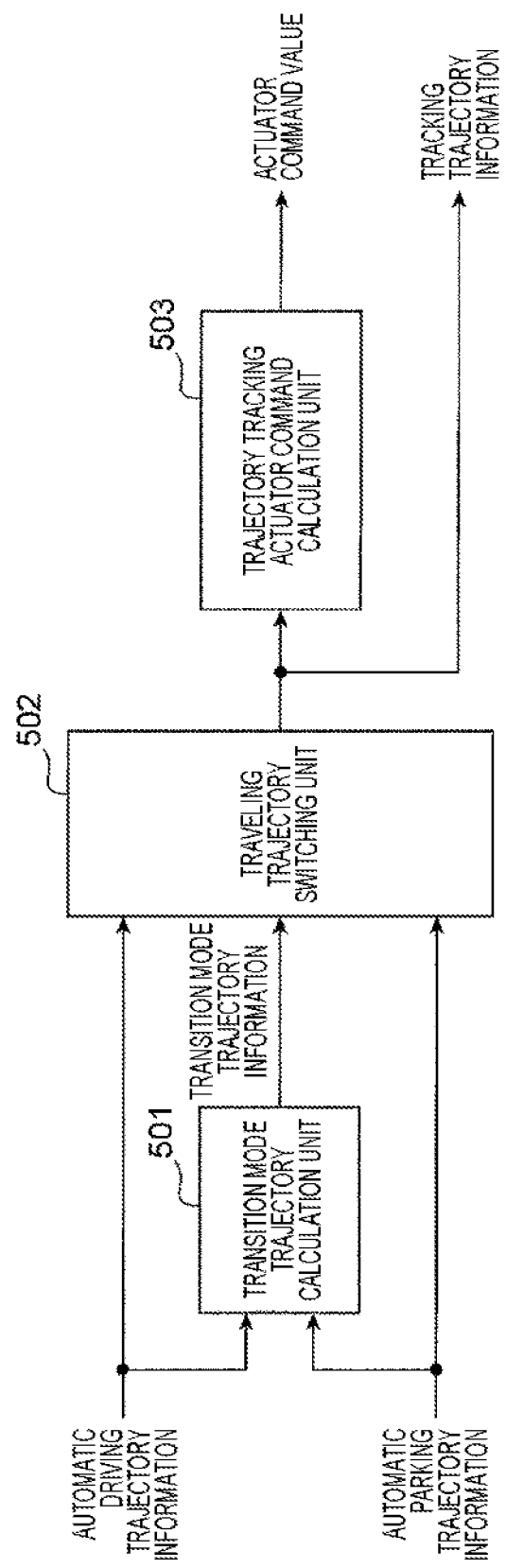
FIG. 5 is a block diagram illustrating a configuration of a vehicle control calculation unit of the automatic driving control device.

Next, the vehicle control calculation unit 205 will be described with reference to a block diagram illustrated in FIG. 5. The vehicle control calculation unit 205 includes a transition mode trajectory calculation unit 501, a traveling trajectory switching unit 502, and a trajectory tracking actuator command calculation unit 503.

The transition mode trajectory calculation unit 501 calculates transition mode trajectory information based on the automatic driving trajectory and the automatic parking trajectory. The transition mode trajectory is a trajectory along which the host vehicle moves in a direction in which the vehicle passes in front of the parking space around the destination, and is set, for example, according to an immediately previous moving state of the host vehicle due to the automatic driving control or a row of a plurality of parking spaces. A linear interpolation method using a last passing point of the host vehicle is considered as a method of calculating the transition mode trajectory information. Here, when the parking trajectory calculation is performed, it is desirable that the trajectory is a simple trajectory that can be smoothly connected to the created parking trajectory.

Examples are illustrated in FIGS. 11A and 11B. FIGS. 11A and 11B are diagrams for describing examples of a method of generating the transition mode trajectory. For example, when the host vehicle 701 travels in an automatic driving mode as illustrated in FIG. 11A, the transition mode trajectory calculation unit 501 calculates a primary linear interpolation straight line 713 by using a plurality of lastly passing points 712 among passing points for each predetermined time in the past on the automatic driving trajectory 711. A last average speed of the host vehicle 701 is calculated. A method of calculating predicted passing points 714 when the host vehicle 701 moves in uniform linear motion on the primary linear interpolation straight line 713 obtained as described above and moves every predetermined time (about 0.1 seconds to 1 second) and using a line connecting a plurality of predicted passing points 714 as a transition mode trajectory 715 is considered.

In addition to this method, for example, as illustrated in FIG. 11B, a method of calculating an end point connection line 722 formed by connecting end points 721a of a plurality of white lines (parking section lines) 721 that define the parking space and a virtual line 723 extending in parallel with the end point connection line 722, calculating predicted passing points 724 when the host vehicle 701 moves at a constant speed on the virtual line 723 and moves every predetermined time (about 0.1 seconds to 1 second), and using a line generated by connecting a plurality of predicted passing points 724 as the transition mode trajectory 725.

As illustrated in FIGS. 14A and 14B, a method of generating a trajectory from an end point 709 of an automatic driving trajectory 706 to a switching point 710 at which the host vehicle 701 switches from moving forward to moving backward as transition mode activation is considered. FIGS. 14A and 14B are diagrams for describing examples of the method of generating the transition mode trajectory. For example, as illustrated in FIG. 14A, it is desirable that a stop position angle θ of the host vehicle 701 at the switching point 710 becomes smaller as a switching width L for parking becomes wider in a parking lot 704.

The stop position angle θ is defined as an angle formed by a vehicle head angle and a longitudinal direction of a parking space 801 at the switching point 710, that is, an angle formed by a vehicle central axis D1 and an axis D2 of the parking space 801 in the longitudinal direction. As illustrated in FIG. 14A, the switching width L is defined as a distance between a fence 1101 present within the parking lot 704 and the end point 721a of the white line 721 defining the parking space 801. The switching width L may be defined by parked vehicles 702a to 702c parked near the parking space 801 or an obstacle such as a pillar.

However, as the stop position angle θ, an angle smaller than 90° is set as an upper limit value θmax, and a value larger than 0° is set as a lower limit value θmin. By doing so, it is possible to reduce a shock caused by acceleration and deceleration when switching from the transition mode trajectory to the automatic parking trajectory is performed. Since the trajectory calculation is easier when the parking trajectory is generated in a state in which the vehicle stops than when the parking trajectory is generated in a state in which the vehicle travels at any speed (moving state), a calculation processing load can be reduced.

Next, the trajectory tracking actuator command calculation unit 503 will be described. The trajectory tracking actuator command calculation unit 503 calculates the operation amounts of a brake, a steering wheel, and an accelerator based on the trajectory information that is the input information. The command values of the actuators for realizing these operation amounts are calculated. Specifically, since trajectory and speed planning information is target information in the future of the host vehicle, a method using a model that outputs control amounts of the actuators based on a physical model of the vehicle when a target position and a target speed are input is considered.

Figure 6:
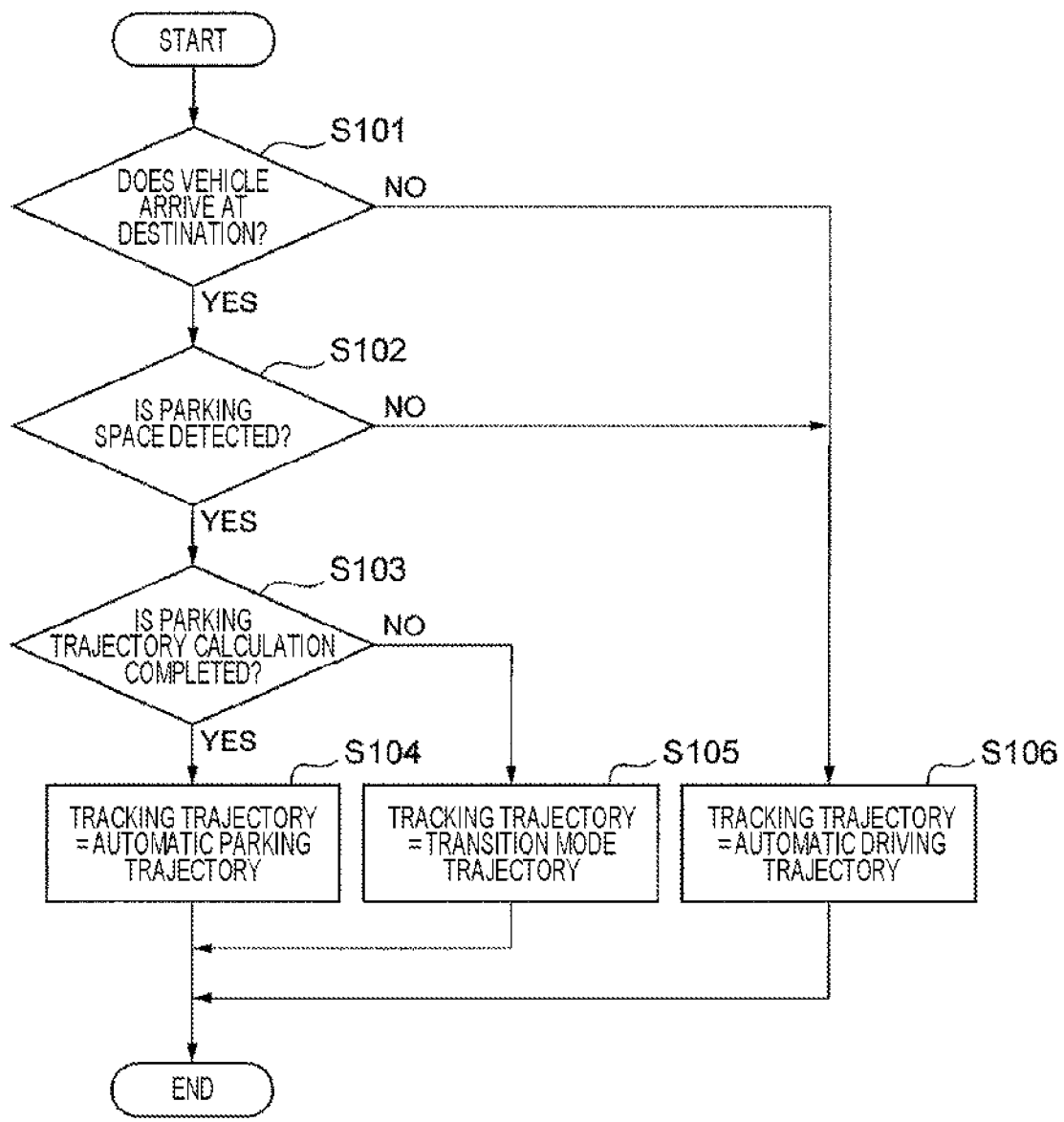
FIG. 6 is a flowchart illustrating control contents executed by a traveling trajectory switching unit of the automatic driving control device.

Next, the traveling trajectory switching unit 502 will be described with reference to a flowchart illustrated in FIG. 6.

In step S101, the control unit (CPU) of the vehicle traveling control device 1 determines whether or not the vehicle arrives near the destination set in the automatic driving control. When it is determined that the vehicle arrives (Yes), the processing proceeds to step S102, and when it is determined that the vehicle does not arrive (No), the processing proceeds to step S106.

In step S102, the control unit (CPU) of the vehicle traveling control device 1 determines whether or not the parking space is detected around the host vehicle. When it is determined that the parking space is detected (Yes), the processing proceeds to step S103, and when it is determined that the parking space is not detection has not been performed (No), the process proceeds to step S106.

In step S103, the control unit (CPU) of the vehicle traveling control device 1 determines whether the parking trajectory calculation IS completed. When it is determined that the parking trajectory calculation is completed (Yes), the processing proceeds to step S104, and when it is determined that the parking trajectory calculation is not completed (No), the processing proceeds to step S105.

In step S104, the control unit (CPU) of the vehicle traveling control device 1 employs, as the tracking trajectory, the automatic parking trajectory calculated by the automatic parking trajectory calculation unit 204.

In step S105, the control unit (CPU) of the vehicle traveling control device 1 employs, as the tracking trajectory, the transition mode trajectory information calculated by the transition mode trajectory calculation unit 501.

In step S106, the control unit (CPU) of the vehicle traveling control device 1 employs, as the tracking trajectory, the automatic driving trajectory calculated by the automatic driving trajectory calculation unit 203.

Next, an example of an operation when the host vehicle is controlled based on the present embodiment will be described with reference to FIGS. 7 to 9.

Figure 7:
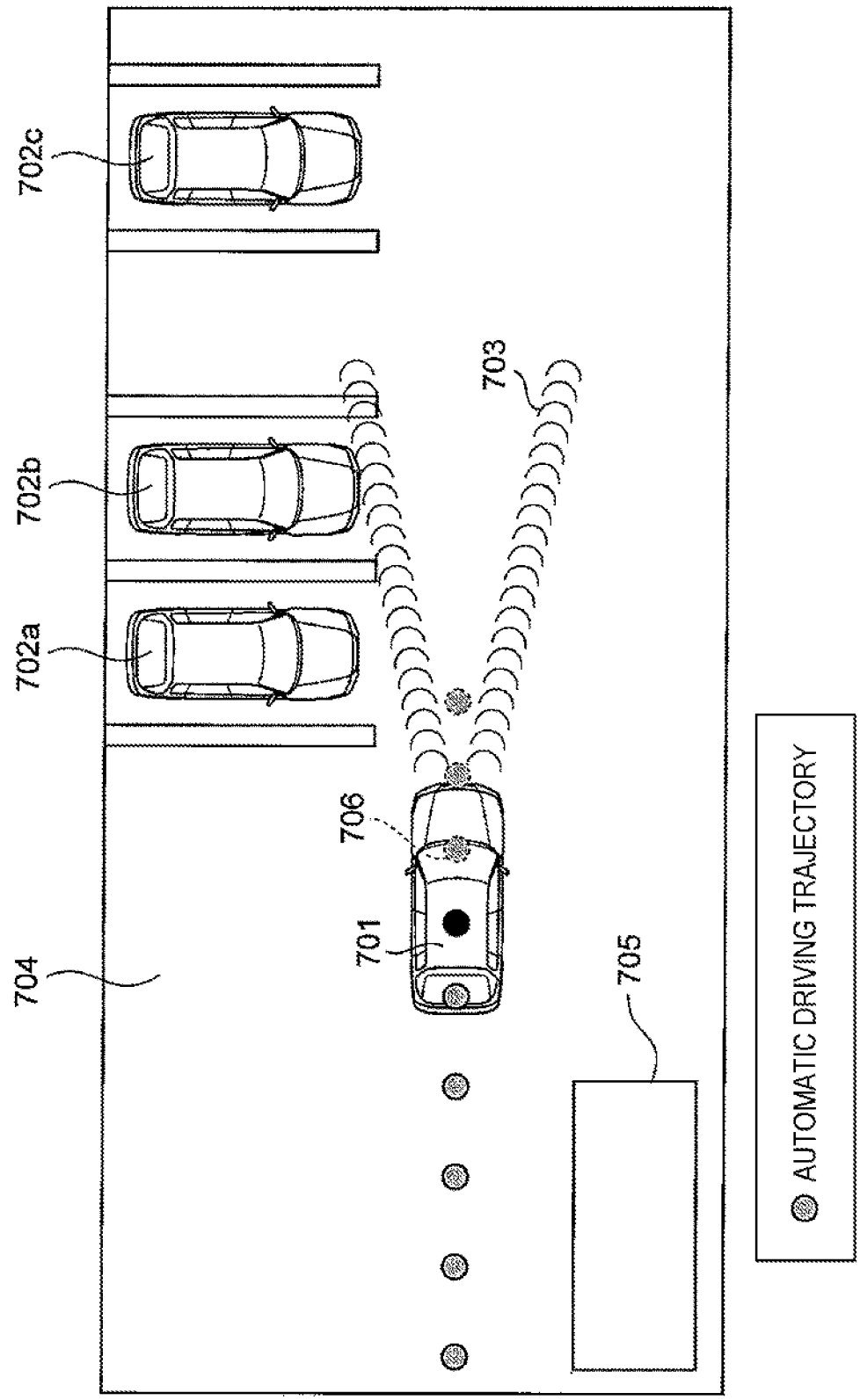
FIG. 7 is an explanatory diagram illustrating an example in which an automatic driving vehicle is moving near a parking space.

FIG. 7 illustrates a scene in which the host vehicle 701 is searching for the parking space within the parking lot 704 near the destination 705. At this point of time, since the parking space in which the vehicle can be parked cannot be detected (NO in S102), the control unit (CPU) of the vehicle traveling control device 1 employs the automatic driving trajectory as the tracking trajectory (S106), and the host vehicle 701 is traveling so as to track the automatic driving trajectory 706 calculated by the automatic driving trajectory calculation unit 203. As a method of displaying the trajectory thereafter, the points through which the vehicle already passes for the planned trajectory in each scene are surrounded by a solid line frame, and a trajectory point sequence planned in the scene is represented by a circle in a broken line frame.

The control unit (CPU) of the vehicle traveling control device 1 searches for the parking space based on information of a parking position search signal 703 output from an external recognition sensor attached to the host vehicle. In the scene illustrated in FIG. 7, it is assumed that there are three parked vehicles (702a to 702c) and there is the parking space between the parked vehicles 702b and 702c.

Figure 8:
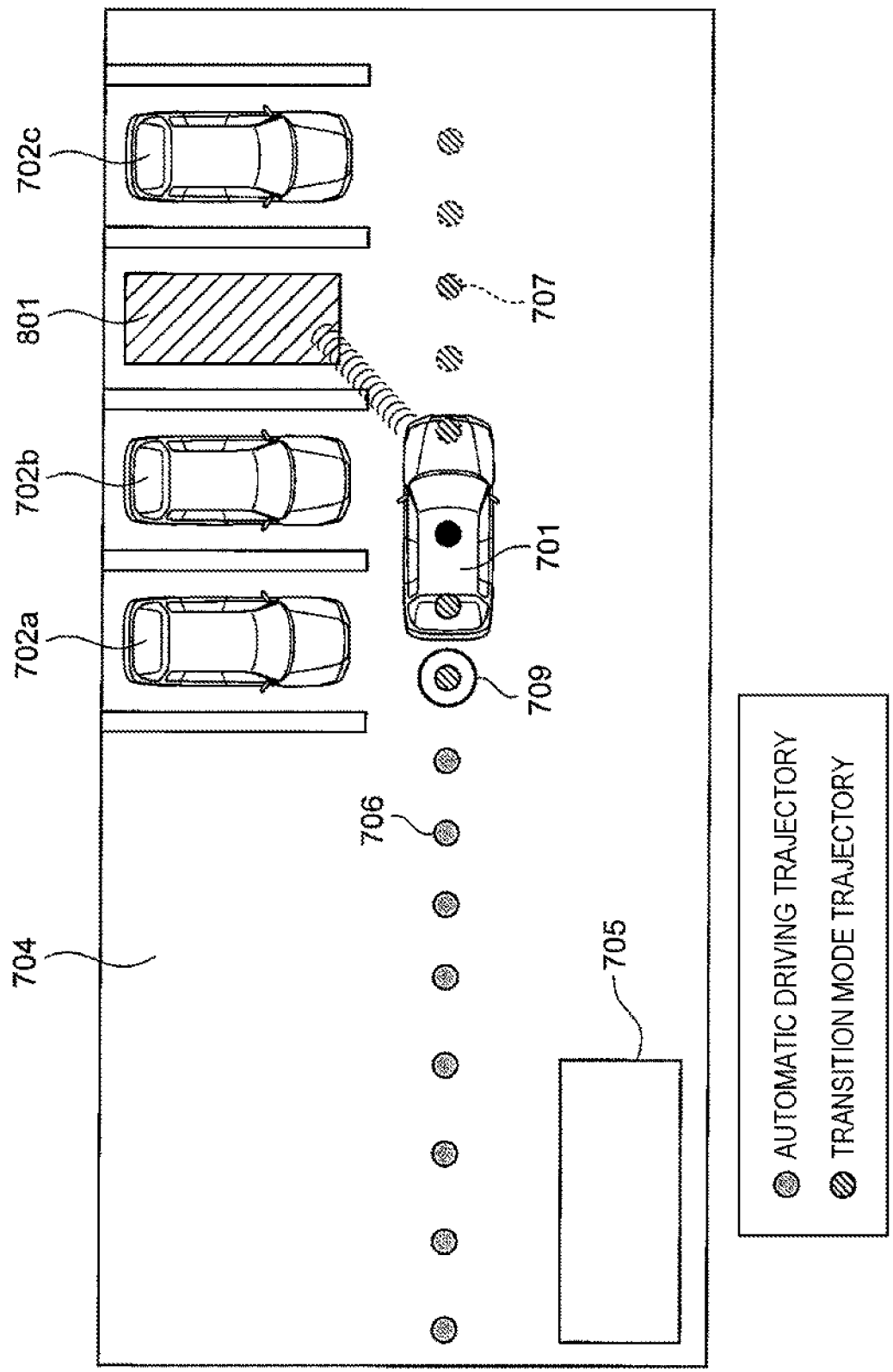
FIG. 8 is an explanatory diagram illustrating an example in which the automatic driving vehicle is moving near the parking space.

FIG. 8 illustrates a scene in which the host vehicle 701 is traveling so as to track the transition mode trajectory 707 by detecting the parking space 801. In this scene, since the parking trajectory calculation of the automatic parking trajectory calculation unit 204 is not completed yet (NO in step S103), the control unit (CPU) of the vehicle traveling control device 1 employs the transition mode trajectory as the tracking trajectory (S105), and the host vehicle 701 is traveling so as to track the transition mode trajectory 707 calculated by the transition mode trajectory calculation unit 501. At a transition mode switching point 709, the tracking trajectory is switched from the automatic driving trajectory 706 to the transition mode trajectory 707 calculated by the transition mode activation calculation unit 501. Even while the vehicle is traveling on the transition mode trajectory 707, the inside of the parking space 801 is detected by the external recognition sensor as in the automatic driving mode. This is because the automatic parking trajectory calculation unit 204 recalculates the parking trajectory calculation when there is an obstacle newly detected by the external recognition sensor while the vehicle is traveling in the transition mode.

Figure 9:
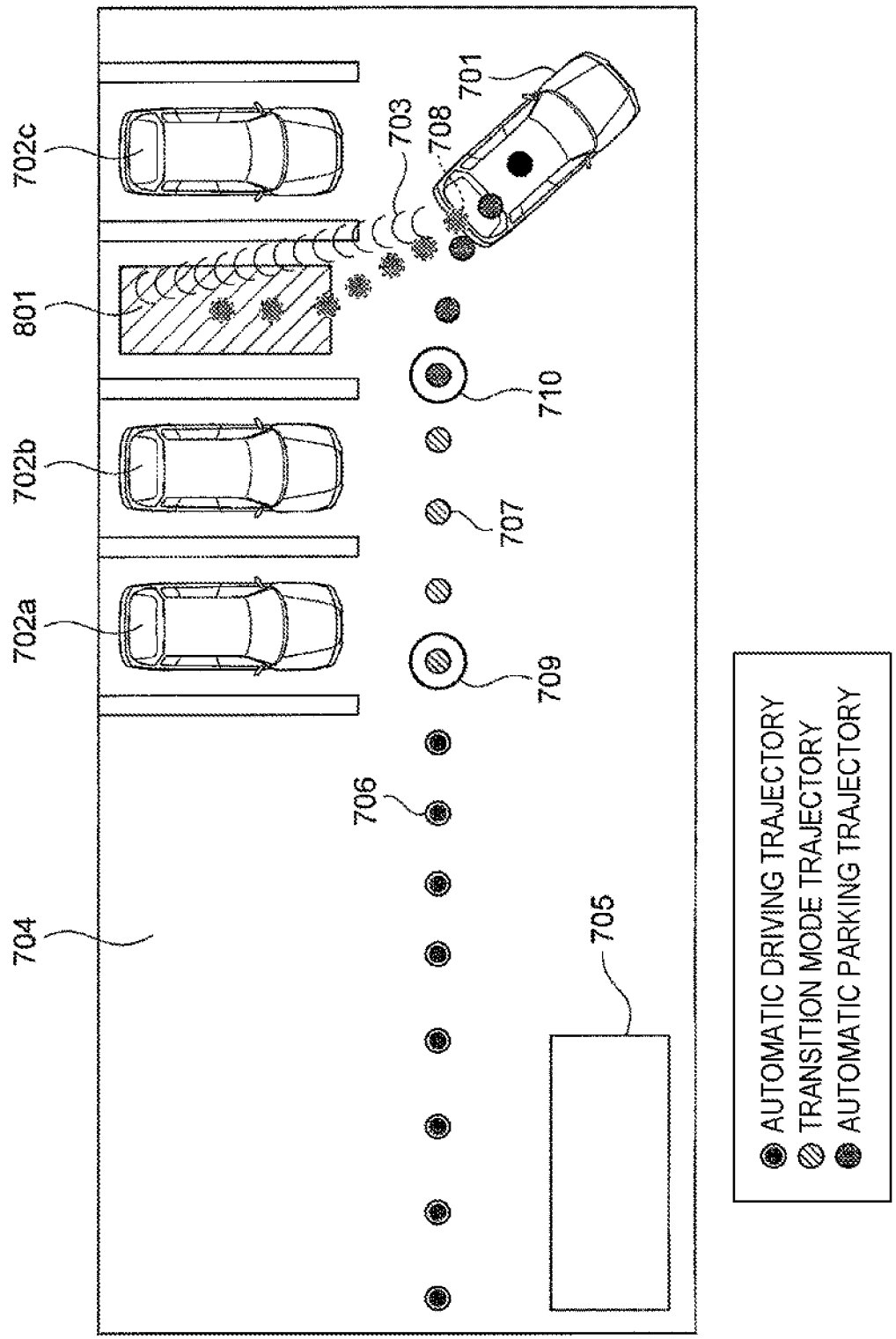
FIG. 9 is an explanatory diagram illustrating an example in which the automatic driving vehicle is moving near the parking space.

FIG. 9 illustrates a scene in which the host vehicle 701 is traveling so as to track the automatic parking trajectory 708. In this scene, since the parking trajectory calculation of the automatic parking trajectory calculation unit 204 is completed (YES in step S103), the control unit (CPU) of the vehicle traveling control device 1 employs the automatic parking trajectory as the tracking trajectory (S104), and the host vehicle 701 is traveling so as to track the automatic parking trajectory 708 calculated by the automatic parking trajectory calculation unit 204. At an automatic parking mode switching point 710, the tracking trajectory is switched from the transition mode trajectory 707 to the automatic parking trajectory 708 calculated by the automatic parking trajectory calculation unit 204.

FIG. 10 is a diagram illustrating changes in the speed of the host vehicle according to the related art and the present invention when the mode of the host vehicle 701 is switched from the automatic driving mode to an automatic parking mode. In the case of the related art, when switching from the automatic driving mode to the automatic parking mode is performed, it is necessary to temporarily stop the host vehicle by setting the host vehicle speed to be substantially zero. Meanwhile, in the case of the present invention, the host vehicle speed does not become substantially zero when switching from the automatic driving mode to the automatic parking mode via the transition mode is performed. When switching to the automatic parking mode via the transition mode is performed, the change in the speed of the host vehicle is small, that is, the acceleration can be reduced, and thus, it is expected that riding comfort is prevented from deteriorating.

According to the aforementioned method, when the trajectory to be tracked is switched from the automatic driving trajectory to the automatic parking trajectory, since it is possible to perform switching during a continuous operation by preparing the transition mode between these modes, a possibility that a sense of anxiety is given to the driver can be eliminated without temporarily stopping the vehicle. According to the vehicle traveling control device 1, since the switching operation of the ECU and the switching operation of the parking are performed at the same timing, unnecessary stoppage and a parking time during parking can be reduced.

Figure 13:
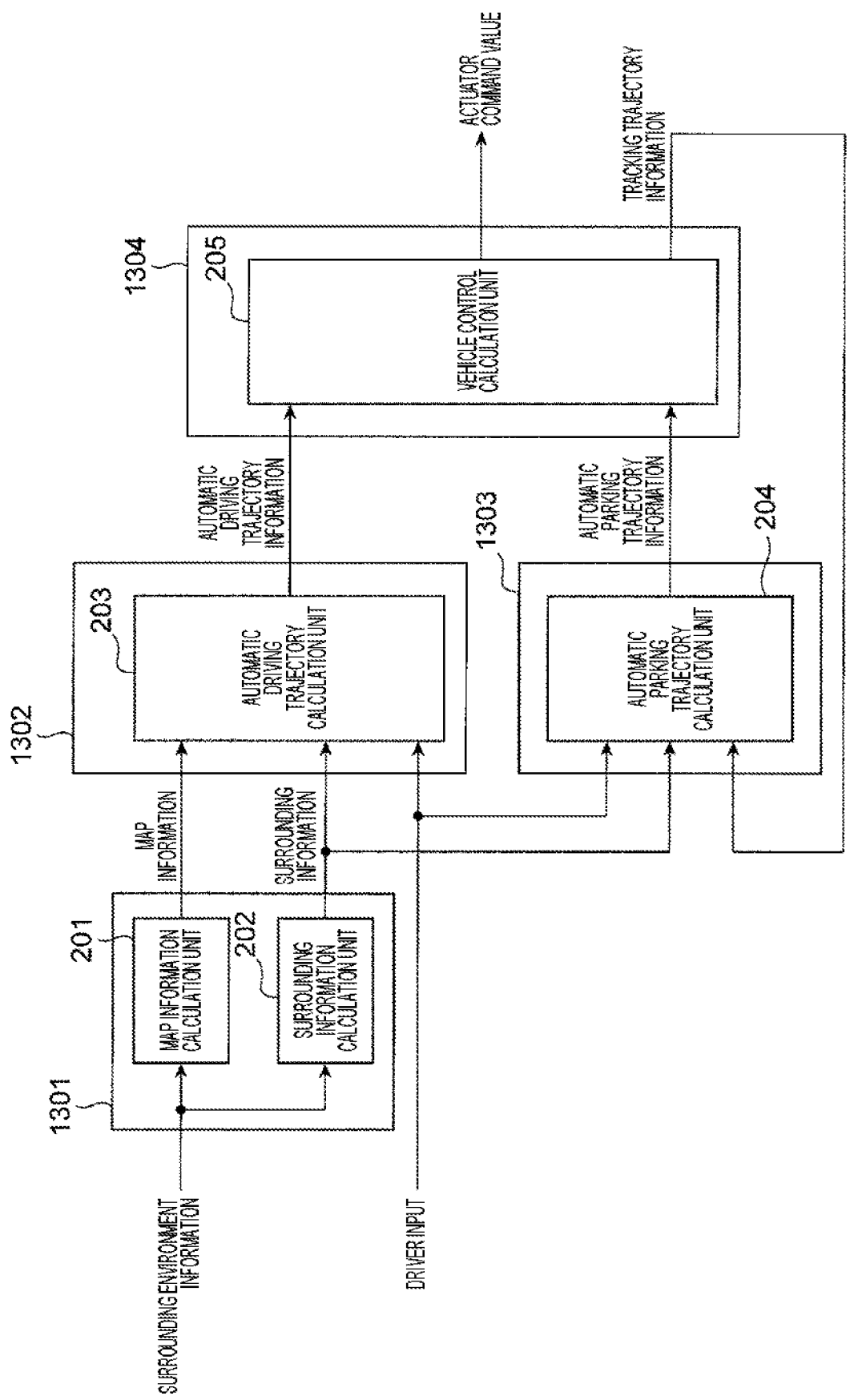
FIG. 13 is an explanatory diagram of a system configuration when calculation units are assigned to individual ECUs.
Figure 15:
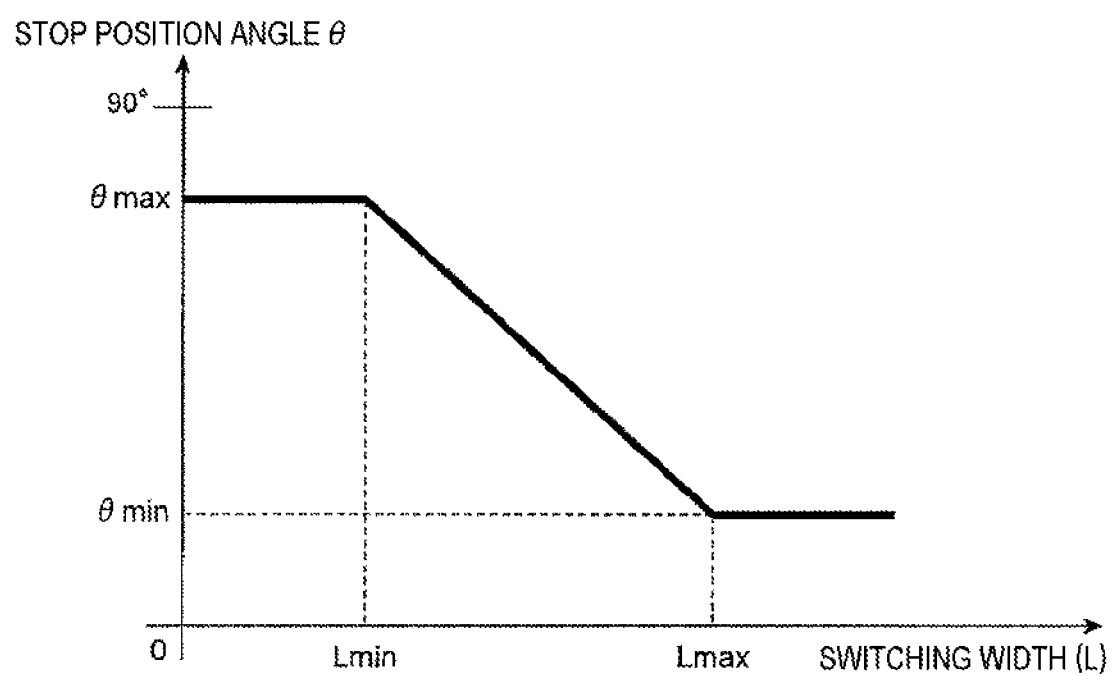
FIG. 15 is a diagram illustrating a relationship between a switching width and a stop position angle.

It has been described that the calculation units are implemented only in the control unit (CPU) of the vehicle traveling control device 1. For example, as illustrated in FIG. 13, a map environment recognition ECU 1301 is used as the map information calculation unit 201 and the surrounding information calculation unit 202, an automatic driving ECU 1302 is used as the automatic driving trajectory calculation unit 203, an automatic parking ECU 1303 is used as the automatic parking trajectory calculation unit 204, and a vehicle control ECU 1304 is used as the vehicle control calculation unit 205. Data communication may be performed between these ECUs via a Controller Area Network (CAN) or Ethernet. These calculation units to individual ECUs in this manner, and thus, unit test verification and parallel development of the ECUs can be performed. Accordingly, it is effective in shortening a development work period. Since an automatic driving system and an automatic parking system can be developed in parallel, development efficiency can be improved, and development can be performed in a short delivery time.

While the embodiments of the present invention have been described in detail, the present invention is not limited to the aforementioned embodiments, and various changes in design may be made without departing from the spirit of the present invention described in the claims. For example, the aforementioned embodiments are described in detail in order to facilitate easy understanding of the present invention, and are not limited to necessarily include all the described components. Some of the components of a certain embodiment can be substituted into the components of another embodiment, and the components of another embodiment can be added to the component of a certain embodiment. In addition, the components of another embodiment can be added, removed, and substituted to, from, and into some of the components of the aforementioned embodiments.

REFERENCE SIGNS LIST

1 vehicle traveling control device
2 to 5 sensor
8 steering control device
15 braking control device
19 acceleration control device
23 communication device
24 display device
701 host vehicle
702 parked vehicle
703 parking position search signal
704 parking lot
705 destination
706 automatic driving trajectory
707 transition mode trajectory
708 automatic parking trajectory
1101 fence

The invention claimed is:

1. A vehicle traveling control device, comprising:
a surrounding environment recognition unit that recognizes a surrounding environment of a host vehicle;
a host vehicle position detection unit that detects a current position of the host vehicle;
an automatic driving trajectory calculation unit that calculates an automatic driving trajectory along which the host vehicle is moved to a destination based on the current position of the host vehicle, the surrounding environment of the host vehicle, and a preset destination input result;
a parking section detection calculation unit that detects a parking space around the destination based on the surrounding environment of the host vehicle;
an automatic parking trajectory calculation unit that calculates an automatic parking trajectory along which the host vehicle is parked in the parking space; and
a transition mode trajectory calculation unit that calculates a transition mode trajectory based on the automatic driving trajectory and the surrounding environment,
wherein the automatic parking trajectory calculation unit calculates the automatic parking trajectory while the host vehicle tracks the transition mode trajectory.

2. The vehicle traveling control device according to claim 1,
wherein the automatic driving trajectory and the automatic parking trajectory are calculated by the same calculation device or different calculation devices in parallel at the same time.

3. The vehicle traveling control device according to claim 1,
wherein the host vehicle is controlled along the transition mode trajectory at a time at which the automatic driving trajectory and the automatic parking trajectory are calculated in parallel.

4. The vehicle traveling control device according to claim 3,
wherein the transition mode trajectory calculation unit calculates the transition mode trajectory by using a point sequence of passing points through which the host vehicle moves along the automatic driving trajectory within a predetermined time in the past.

5. The vehicle traveling control device according to claim 4,
wherein the transition mode trajectory calculation unit calculates a straight line by performing linear interpolation on the point sequence of the passing points through which the vehicle moves along the automatic driving trajectory within the predetermined time in the past, and calculates the transition mode trajectory by using a point sequence of predicted passing points when it is predicted that the host vehicle moves in uniform linear motion along the straight line.

6. The vehicle traveling control device according to claim 4,
wherein the transition mode trajectory calculation unit calculates a virtual line in parallel with a straight line defined by connecting end points of parking section lines defining the parking space, and calculates the transition mode trajectory by using a point sequence of predicted passing points when it is predicted that the host vehicle moves in uniform linear motion along the virtual line.

7. The vehicle traveling control device according to claim 4,
wherein, when an end point of the transition mode trajectory is used as a switching point for parking, as a switching width for parking becomes wider, a stop position angle which is an angle formed by a vehicle head angle at the switching point and a longitudinal direction of the parking space becomes smaller.

8. The vehicle traveling control device according to claim 7,
wherein, as the stop position angle, an angle smaller than 90 degrees is used as an upper limit value θmax, and a value larger than 0 degrees is used as a lower limit value θmin.

9. The vehicle traveling control device according to claim 1,
wherein the automatic parking trajectory is generated on the transition mode trajectory such that the transition mode trajectory and a start point of the automatic parking trajectory substantially coincide with each other.

10. The vehicle traveling control device according to claim 9,
an angle formed by a tangent of the transition mode trajectory at a point at which the transition mode trajectory and the start point of the automatic parking trajectory coincide with each other and a tangent at the start point of the automatic parking trajectory becomes zero.

11. The vehicle traveling control device according to claim 9,
wherein a target vehicle speed of the transition mode trajectory at the point at which the transition mode trajectory and the start point of the automatic parking trajectory coincide with each other and a target vehicle speed at the start point of the automatic parking trajectory coincide each other and are equal to or greater than zero.

12. A vehicle traveling control device that performs automatic driving control for moving a host vehicle to a destination and automatic parking control for parking the host vehicle in a parking space around the destination, the vehicle traveling control device comprising:
an automatic driving trajectory calculation unit that calculates an automatic driving trajectory along which the host vehicle moves to the destination;
an automatic parking trajectory calculation unit that calculates an automatic parking trajectory along which the host vehicle is parked in the parking space;
a transition mode trajectory calculation unit that calculates a transition mode trajectory connecting the automatic driving trajectory and the automatic parking trajectory to each other, wherein
the transition mode trajectory calculation unit calculates a transition mode trajectory along an immediately previous movement state of the host vehicle due to the automatic driving control or the parking space,
the automatic parking trajectory calculation unit starts to calculate the automatic parking trajectory when the host vehicle tracks the transition mode trajectory and the parking space is set; and
a vehicle control calculation unit that sets the automatic parking trajectory to a tracking trajectory along which the host vehicle tracks when the host vehicle arrives at the destination and detects the parking space around the destination and the calculation of the automatic parking trajectory along which the host vehicle is parked is completed, sets the transition mode trajectory to the tracking trajectory when the calculation of the automatic parking trajectory is not completed, and sets the automatic driving trajectory as the tracking trajectory when the host vehicle does not arrive at the destination or does not detect a parking position.

* * * * *